United States Patent [19]

Tamai

[11] Patent Number: 5,710,979
[45] Date of Patent: Jan. 20, 1998

[54] MONITORING A LOCAL STATION WITH FIRST AND SECOND MESSAGES USED WHEN THE LOCAL STATION IS IN NORMAL OPERATION AND IS NOT AND IS BUSY

[75] Inventor: Masayoshi Tamai, Tokyo, Japan

[73] Assignee: NEC Corporation, Tokyo, Japan

[21] Appl. No.: 535,535

[22] Filed: Sep. 28, 1995

[30] Foreign Application Priority Data

Sep. 30, 1994 [JP] Japan ............................ 6-261631

[51] Int. Cl.$^6$ .................................... H04B 17/00
[52] U.S. Cl. .................. 455/67.1; 455/58.2; 455/67.4
[58] Field of Search .................. 455/54.1, 54.2, 455/67.1, 67.4, 69, 9, 58.2, 67.7, 63; 371/20.5; 379/32, 34

[56] References Cited

U.S. PATENT DOCUMENTS

| | | | |
|---|---|---|---|
| 4,987,571 | 1/1991 | Haymond et al. | 370/85.2 |
| 5,301,360 | 4/1994 | Goldberg | 455/67.4 |
| 5,307,509 | 4/1994 | Michalon et al. | 455/67.1 |
| 5,335,356 | 8/1994 | Andersson | 455/67.1 |

FOREIGN PATENT DOCUMENTS 183237  7/1989  Japan .

*Primary Examiner*—Curtis Kuntz
*Assistant Examiner*—Sam Bhattacharya
*Attorney, Agent, or Firm*—Scully, Scott, Murphy & Presser

[57] ABSTRACT

In a communication network wherein a control station sends a communication test command once in each test cycle through a transmission path to a local station which sends a response signal back to the control station while kept in normal operation, the local station sends first and second response messages as the response signal while rendered idle and busy, respectively. Supplied with the first and the second response messages in one test cycle, the control station sends the communication test command to the local station in an immediately subsequent test cycle a normal and a longer test interval later, respectively. If supplied with no response signal, the control station sends the communication test command in the subsequent test cycle a shorter interval later and uses a shorter interval than a normal monitor interval in the subsequent test cycle in monitoring whether or not the response signal is received in response to the communication test command transmitted in this test cycle to the local station from which no response signal is received in the above-mentioned one test cycle. Usually, the local station is one of a plurality of local stations connected to the control station through the transmission path.

20 Claims, 8 Drawing Sheets

MONITORING A LOCAL STATION WITH FIRST AND SECOND MESSAGES USED WHEN THE LOCAL STATION IS IN NORMAL OPERATION AND IS NOT AND IS BUSY

BACKGROUND OF THE INVENTION

This invention relates to a monitoring method of and system for monitoring, in communication network comprising a control or center station and a local station, such local stations at the control station by transmitting a communication test command to the local stations, one at a time, at a predetermined test interval and by monitoring presence or absence of a response signal sent back to the control station from the local station under consideration. This invention relates furthermore to a control station and to a local station for use in a local station monitoring system of the type described.

In the communication network, the control station is connected to the local stations through a transmission path for communication between the control station and each local station. The transmission path may be a wired or a radio path or any other communication path. Depending on the communication network, the local stations may be various communication terminal equipment. For example, the local stations may include, in a radio communication network, a mobile station which may be a portable telephone handset.

Local station monitoring methods and systems of the type described are known. In a typical example disclosed in Japanese Patent Prepublication (A) No. 183,237 of 1989, the control station comprises a central transmitter unit for transmitting the communication test command to each local station at a predetermined test interval. The local station comprises a local receiver unit for receiving the communication test command as a received test command and a local transmitter unit responsive to the received test command for transmitting the response signal back to the control station. The control station further comprises a central receiver unit for receiving the reception signal as an acknowledge signal. In the control station, a no response timer measures a lapse of time from transmission of each communication test command to one of the local stations that will be called a particular station. Responsive to the acknowledge signal and the lapse of time measured by the no response timer unit, a monitoring unit judges that the particular station is and is not in normal operation if the acknowledge signal is and is not received within a predetermined monitor interval, respectively, from transmission to the particular station of the transmission test command under consideration.

During kept in normal operation, the local transmitter and receiver units of each local station are operable in various communication activities, such as communication between the particular station and the control station or the particular station and another of the local stations through the control station. Even while put in a busy state in this manner, each local station must send the response signal back to the control station so that the acknowledge signal is produced within the monitor interval. This results in a lengthened busy state and in an obstacle in the communication activities and even in a hindrance in operation of the control station.

The local transmitter and/or receiver unit may be involved in a trouble to put each local station out of the normal operation. Alternatively, the local station may be put out of the normal operation as viewed from the control station when a disturbance takes place in the transmission path between the control station and the local station being monitored. The transmission path may be disturbed, when the local station is the mobile station, by a topological influence. The trouble may be obviated. The disturbance may disappear in due course. The local station is put in this manner back to the normal operation. In the local station monitoring method and system revealed in the patent prepublication cited above, the communication test command is repeatedly sent to each local station to detect recovery to the normal operation of the local station which is seemingly put out of the normal operation. It is, however, impossible with this conventional local station monitoring method or system to rapidly detect the recovery.

SUMMARY OF THE INVENTION

It is therefore a principal object of the present invention to provide a local station monitoring method of monitoring, in a communication network comprising a control station and a local station, the local station at the control station with transmission of a transmission test command to the local station at a test interval and reception of a response signal from the local station as regards whether or not the local station is in normal operation, wherein communication activities of the local station are little hindered by reception of the communication test command and transmission of the response signal in response to reception of the communication test command.

It is another principal object of this invention to provide a local station monitoring method which is of the type described and in which the communication activities are little disturbed in the local station by the transmission of a response signal while the local station is in a busy state.

It is still another principal object of this invention to provide a local station monitoring method which is of the type described and in which the control station can discriminate as regards each local station whether or not the local station is busy while kept in the normal operation.

It is yet another principal object of this invention to provide a local station monitoring method which is of the type described and in which the test interval is varied depending on whether or not the station is busy.

It is a subordinate object of this invention to provide a local station monitoring method which is of the type described and by which it is possible at the control station to rapidly detect recovery of each local station from a trouble with shortening of the test interval after the local station is subjected to the trouble.

It is another subordinate object of this invention to provide a local station monitoring method which is of the type described and in which the control station rapidly detects the recovery by quickly monitoring the local station in question as regards whether not the local station is not yet put back into the normal operation.

It is a further object of this invention to provide a local station monitoring system for implementing the local station monitoring method of the type described.

It is a still further object of this invention to provide a control station for use in a local station monitoring system of the type described.

It is a yet further object of this invention to provide a local station for use in a local station monitoring system of the type described.

In accordance with an aspect of this invention, there is provided a local station monitoring method of monitoring, in a communication network comprising a control station, a local station, and a transmission path for communication between the control station and the local station, the local station at the control station with transmission of a communication test command to the local station at a test interval and with reception of a responsive signal from the local station as regards whether or not the local station is in normal operation, comprising the steps of: (A) transmitting at the local station back to the control station a first and a second response message as the response signal upon reception of the communication test command when the local station is not and is busy, respectively; and (B) using at the control station a longer interval than the test interval on subsequently transmitting the communication test command to the local station while the control station receives the second response message.

In accordance with a different aspect of this invention, there is provided a local station monitoring system for monitoring, in a communication network comprising a control station, a local station, and a transmission path for communication between the control station and the local station, the local station at the control station with transmission of a communication test command to the local station at a test interval and with reception of a response signal from the local station as regards whether or not the local station is in normal operation, wherein: the local station comprises local transmitting means responsive to the communication test command for transmitting a first and a second response message as the response signal back to the control station when the local station is not and is busy, respectively, upon reception of the communication test command; (B) the control station comprising transmission timing means for timing subsequent transmission of the communication test command to the local station with a longer interval than the test interval used while the control station receives the second response message.

In accordance with another different aspect of this invention, there is provided a control station for monitoring, in a communication network comprising besides the control station a local station and a transmission path for communication between the control station and the local station, the local station as regards whether or not the local station is in normal operation, wherein the control station comprises: (A) transmitting means for transmitting a communication test command to the local station at a test interval; (B) receiving means for receiving a response signal transmitted from the local station back to the control station in response to the communication test command with a first and a second response message received as the response signal when the local station is not and is busy upon reception of the communication test command, respectively; and (C) transmission timing means for timing the transmitting means for subsequent transmission of the communication test command to the local station with a longer interval than the test interval used while the receiving means receives the second response message.

In accordance with a further different aspect of this invention, there is provided a local station monitored, in a communication network comprising besides the local station a control station and a transmission path for communication between the control station and the local station, by the control station with a communication test command transmitted from the control station to the local station at a test interval, wherein: (A) the local station comprises: (a) local receiving means for receiving the communication test command; and (b) local transmitting means for transmitting a response signal back to the control station with a first and a second response message used as the response signal if the local station is not and is busy, respectively, when the local receiving means receives the communication test command; (B) the control station Judging, when the control station receives and does not receive the response signal within a monitor interval shorter than the test interval after transmission of the communication test command, that the local station is and is not in normal operation, respectively.

DESCRIPTION OF THE PREFERRED EMBODIMENT

Figure 1:
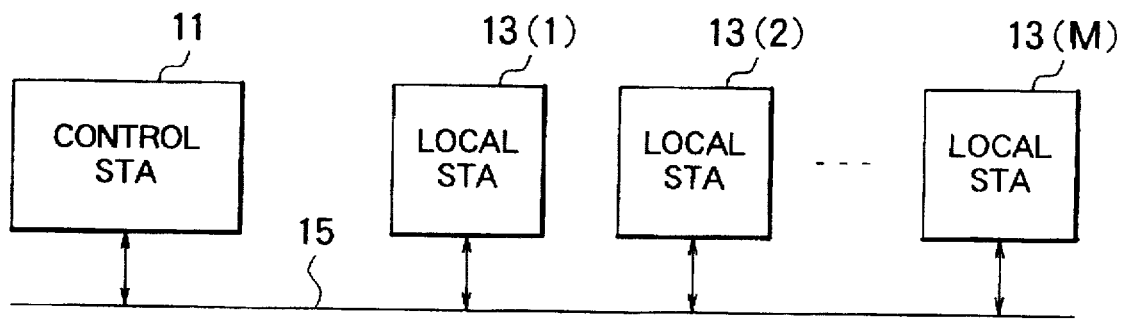
FIG. 1 is a block diagram of a communication network to which the instant invention is applicable.

Referring to FIG. 1, a communication network will first be described in order to facilitate an understanding of the present invention applied thereto. The communication network comprises a control or center station 11. First through M-th local stations 13(1), 13(2), . . . , and 13(M) are connected to the control station 11 through a transmission path 15, where M represents a predetermined integer which depends on the scale of the communication network. The local stations will collectively be denoted by a simple reference numeral 13. When taken into consideration, each of the local stations 13 will be referred to as an m-th local station 13(m), where m is variable between 1 and M, both inclusive. Such notations will be used throughout the description.

The transmission path 15 is for communication between the control station 11 and the local stations 13. In a local station monitoring system according to this invention, the transmission path 15 is furthermore used in transmitting a communication test command from the control station 11 to each local station 13(m) at a test interval and a response signal sent from the local station 13(m) back to the control station 11 to monitor whether or not the local stations 13 are in normal operation capable of communicating with the control station 11 and with one another through the control station 11. A response interval is necessary for each local station 13(m) between reception of the communication test command directed thereto and transmission of the response signal back to the control station 11.

Figure 2:
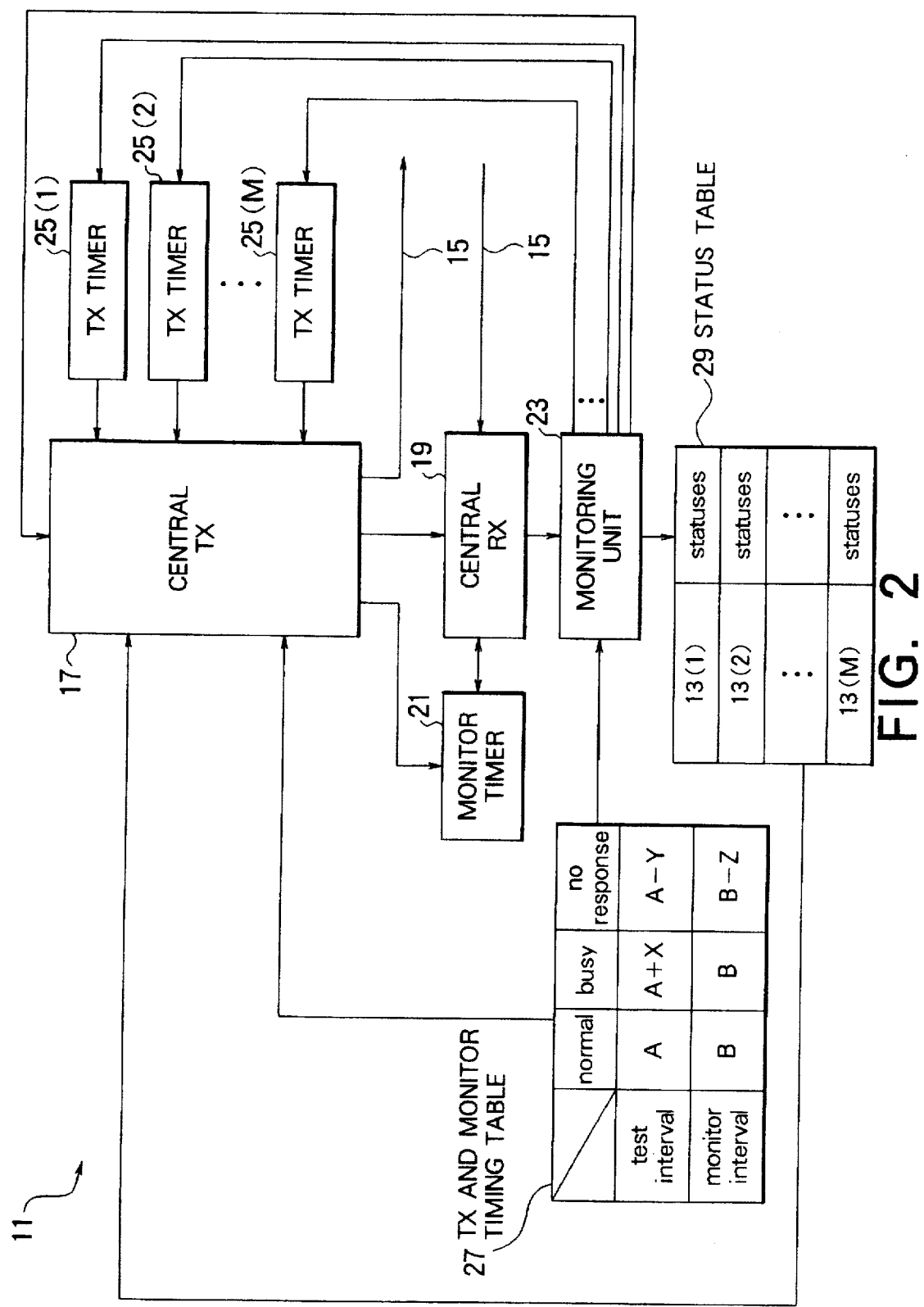
FIG. 2 shows functional blocks for implementing this invention in a control station of the communication network depicted in FIG. 1.

Referring now to FIG. 2 in addition to FIG. 1, the control station 11 comprises a central transmitter unit 17 for sending the communication test commands to the local stations 13 under various control situations used according to this invention in the manner which will become clear as the description proceeds. A central receiver unit 19 receives the response signals from the local stations 13. Concurrently with transmission of the communication test command to the m-th local station 13(m), the central transmitter unit 17 requests the central receiver unit 19 to receive the response signal from the m-th local station 13(m).

It is known to use a no response timer 21 and a monitoring unit 23. Connected to the central transmitter unit 17, the no response timer 21 begins to measure a lapse of monitor time from transmission of the communication test command to each local station 13(m). Upon reception of the response signal from the local station 13(m) under consideration, the central receiver unit 19 refers to the no response timer 21. Connected to the central receiver unit 19, the monitoring unit 23 judges that the local station 13(m) in question is and is not in the normal operation if the response signal is and is not received, respectively, before the lapse of monitor time becomes equal to a monitor interval.

In accordance with this invention, first through M-th transmission timers 25(1), 25(2), ..., and 25(M) or 25 are connected to the central transmitter unit 17 in one-to-one correspondence to the local stations 13 and are controllable. The no response timer 21 is also controllable and will hereafter be referred to as a monitor timer 21. The monitoring unit 23 is connected to the transmission timers 25.

The central transmitter unit 17 is accompanied by a transmission and monitor timing table 27. The monitoring unit 23 is accompanied by a status table 29. In cooperation with the status table 29, the transmission and monitor timing table 27 controls the monitor timer 21 through the central transmitter unit 17 and the transmission timers 25. It should be understood in FIG. 2 that control of the transmission timers 25 is illustrated by connection of the transmission and monitor timing table 27 through the monitoring unit 23. In the manner readily understood by one skilled in the art from the following description, the status table 29 is implemented by a memory. The transmission and monitor timing table 27 is implemented by a microprocessor.

In the manner described heretobefore, the local stations 13 may and may not be in a busy state while kept in the normal operation. As described above, the local stations 13 may be put out of the normal operation as a result of a trouble either therein or in the transmission path 15 between the control station 11 and the local station or stations 13. Such statuses of the local stations 13 are detected according to this invention by the monitoring unit 23 and are rewritably stored in the status table 29. Merely for convenience of the description which follows, the statuses will be classified into "normal" (comprising a status of being not busy), "busy", and "no response" (including another status of being not in the normal operation).

The transmission and monitor timing table 27 defines the test interval for each transmission timer 25(m) and the monitor interval for the monitor timer 21. While each local station 13(m) is kept in the normal operation, the test interval and the monitor interval are equal to a normal test value A and a normal monitor value B. The normal test value is determined as will become clear from the following. The normal monitor value is a little longer than the response interval. When each local station 13(m) is busy, a busy test value (A+X) and the normal monitor value B are given to a corresponding transmission timer 25(m) and to the monitor timer 21 as the test and the monitor intervals, where X represents a positive value less than the normal monitor value. When each local station 13(m) is not in the normal operation, a no response test value (A−Y) and a no response monitor value (B−Z) are given to the corresponding transmission timer 25(m) and the monitor timer 21, where each of Y and Z represents a positive value less than the normal monitor value. The values of X, Y, and Z are empirically decided in dependency on the communication network and may or may not be identical with one another.

Figure 3:
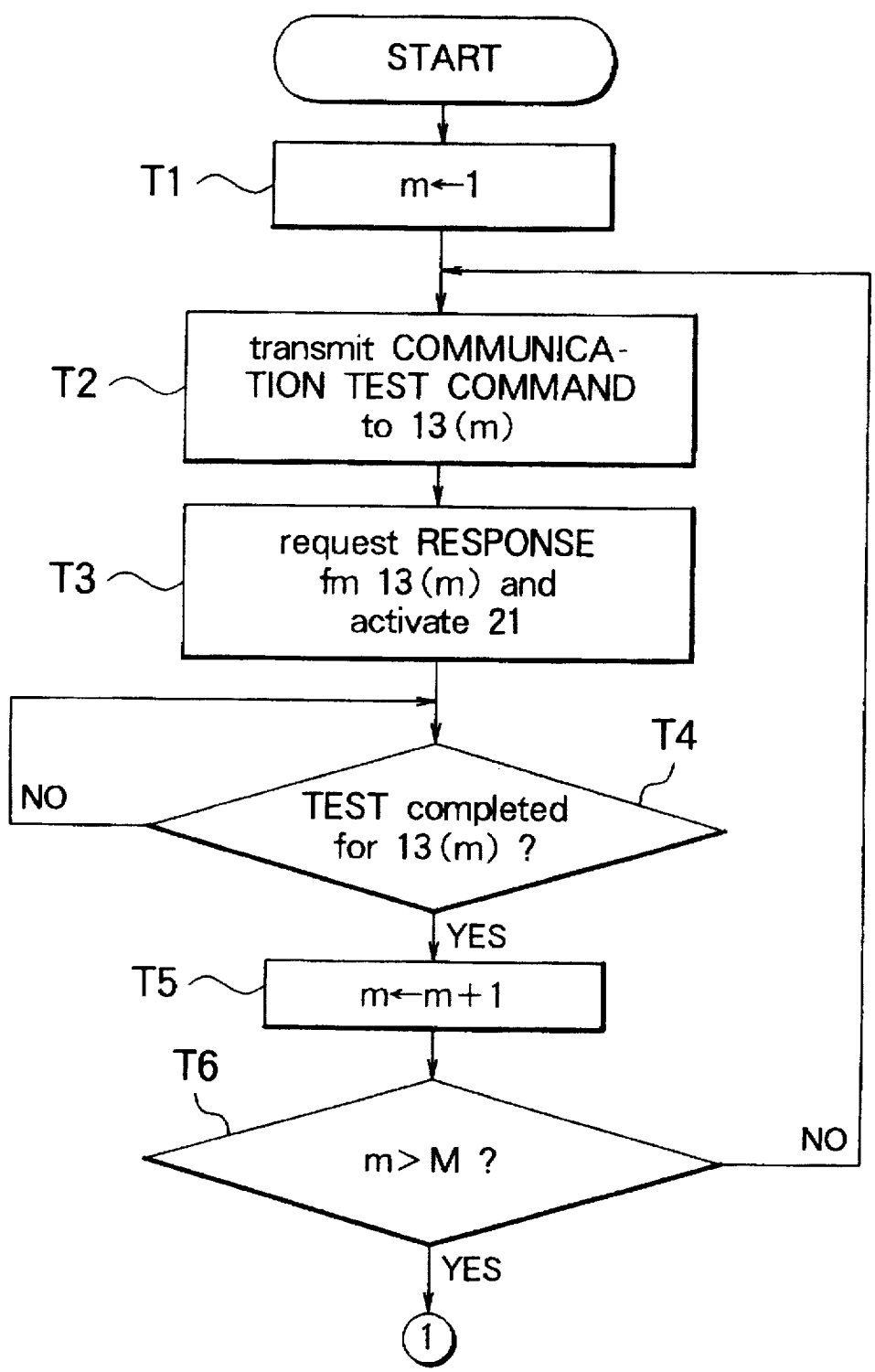
FIG. 3 shows a flow chart for use in exemplifying a part of transmission of a communication test command in the control station mentioned in conjunction with FIG. 2.

Turning to FIG. 3 with FIGS. 1 and 2 continuously referred to, the central transmitter unit 17 is operable as follows when put into operation. During this operation, the control station 11 consecutively tests the local stations 13 as regards their statuses to complete an initial test cycle. The normal test and monitor values A and B are used in the transmission timers 25 and in the monitor timer 21. The normal test value A is longer than the initial test cycle.

A local station number m is given first a value of 1 at a first transmission step T1. In the manner which will presently be described, the local station number is consecutively incremented. It will be assumed that the local station number is equal to m at a certain time instant to indicate the m-th local station 13(m). At a second transmission step T2, the central transmitter unit 17 sends the communication test command to the m-th local station 13(m). Substantially simultaneously at a third transmission step T3, the central transmitter unit 17 requests the central receiving unit 19 to receive the response signal from the m-th local station 13(m) and puts the monitor timer 21 in operation of measuring the lapse of monitor time. Preferably, the central receiver unit 19 resets the monitor timer 21 upon reception of the response signal from each local station 13(m). The monitor timer 21 delivers a monitor time out signal back to the central receiver unit 19 when the monitor timer 21 remains in operation after the lapse of monitor time of the normal monitor value.

When the central receiver unit 19 receives the response signal from the m-th local station 13(m), the central receiver unit 19 informs the monitoring unit 23 of this fact. The monitoring unit 23 monitors the status of the m-th local station 13(m) and keeps the status as a latest status in the status table 29. In the meanwhile, the monitoring unit 23 repeatedly checks at a fourth transmission step T4 whether or not this test has given a current status of the m-th local station 13(m). Through a connection depicted between the central transmitter unit 17 and the monitoring unit 23, the central transmitter unit 17 is informed of completion of the test for the m-th local station 13(m).

When the test is found complete at the fourth transmission step T4 for the m-th local station 13(m), the central transmitter unit 17 adds one to the local station number m at a fifth transmission step T5. At a sixth transmission step T6, the central transmitter unit 17 checks whether or not the local station number m is greater than the predetermined integer M. While the local station number is less than or equal to the predetermined integer at the sixth transmission step T6, the second through the sixth transmission steps are repeated. When the local station number grows equal to the predetermined integer plus one at the sixth transmission step T6, the initial test cycle comes to an end for the local stations 13. Operation of the control station 11 proceeds to a remaining portion which will later be described.

Figure 4:
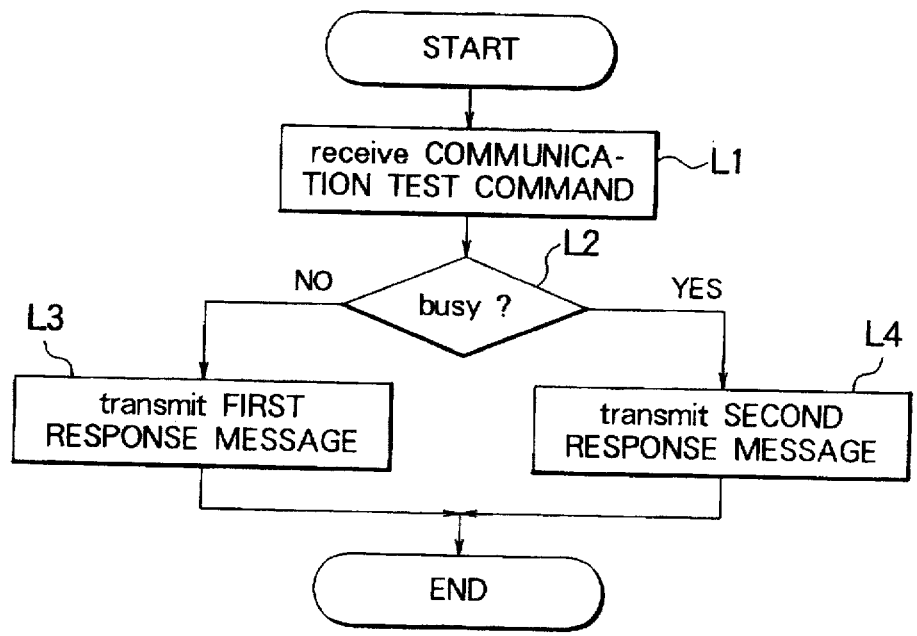
FIG. 4 shows a flow chart for use in describing operation in a local station illustrated in FIG. 1.

Turning to FIG. 4 with FIG. 1 again referred to, each local station 13(m) is operable as follows when the communication test command is supplied thereto at a first local step L1. Upon reception of the communication test command under consideration, the local station judges at a second local step L2 whether or not the local station is busy. When the local station is not busy, the local station transmits a first response message back to the control station 11 at a third local step L3. When the local station is busy, the local station transmits a second response message back to the control station 11 at a fourth local step L4. In either event, operation of the local station comes to an end.

The first and the second response messages are either collectively or individually called the response signal and are separatedly detected by the control station 11. It is possible to understand the first local step L1 as a local receiver arrangement and the third and the fourth local steps L3 and L4 altogether as a local transmitter arrangement. When a fault is present either in the local receiver and/or transmitter arrangement or in the transmission path 15 between the control station 11 and the local station 13(m) under consideration, namely, when the local station 13(m) is not in the normal operation, the control station 11 receives no response signal from the local station in question.

Each local station 13(m) comprises a local transmitter and a local receiver which are not shown, are for communication data, and are operable also as the local transmitter and receiver arrangements by addition of a small facility thereto. As a consequence, it is possible with no problem to even adapt a portable telephone handset to the local station 13(m) according to this invention. The local station 13(m) is not in the normal state when power source is switched off in, for example, a mobile station used as the local station 13(m). At the second local step L2, the local station 13(m) is Judged to be busy when the local transmitter and receiver are dealing with the communication data. For example, the local station 13(m) is busy when the communication data remain in a buffer to a certain amount for transmission by the local transmitter thereof to either the control station 11 or another of the local stations 13.

Figure 5:
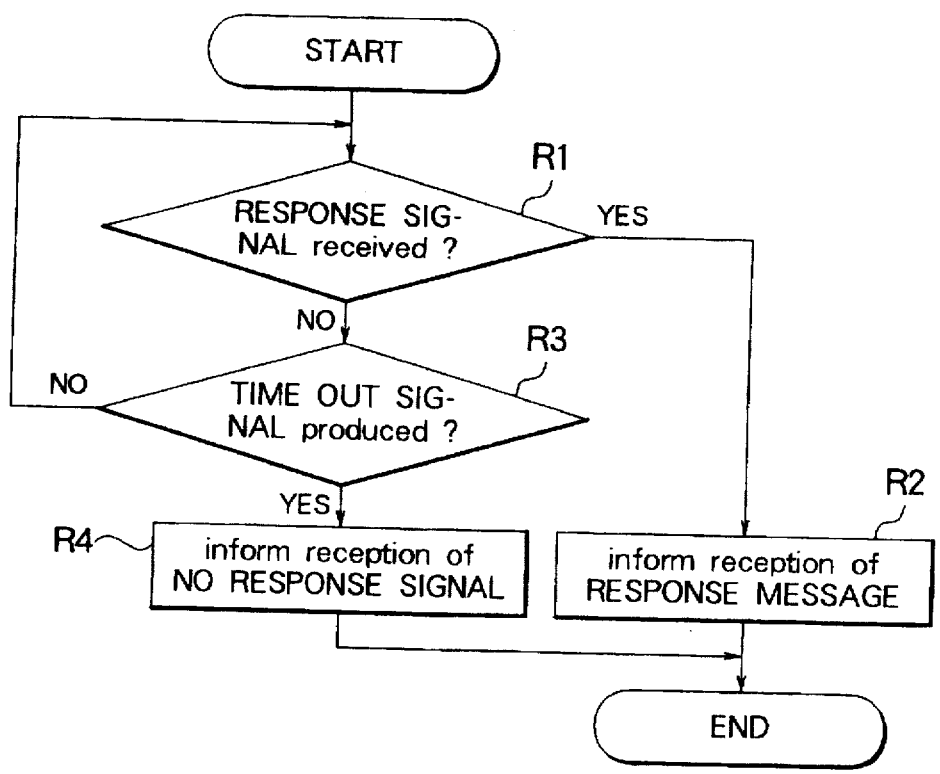
FIG. 5 shows a flow chart for use in exemplifying reception of response messages in the control station mentioned in connection with FIG. 2.

Further turning to FIG. 5 with FIGS. 1 through 4 referred to, the central receiver unit 19 is operable as follows when the communication test command is sent by the central transmitter unit 17 to the m-th local station 13(m) at the second transmission step T2. In the manner described in conjunction with the third transmission step T3, the monitor timer 21 measures the lapse of monitor time during operation of the central receiver unit 19 until either reset by the central receiver unit 19 or delivery of the monitor time out signal to the central receiver unit 19.

At a first reception step R1, the central receiver unit 19 judges whether or not the response signal is received from the m-th local station 13(m). When the response signal is received, the central receiver unit 19 informs the monitoring unit 23 of this fact at a second reception step R2. The operation of the receiver unit 19 comes to an end insofar as the m-th local station 13(m) is involved.

If the response signal is not detected at the first reception step R1, operation of the central receiver unit 19 proceeds to a third reception step R3 of either referring to the monitor timer 21 as regards the lapse of monitor time or judging whether or not the monitor time out signal is supplied from the monitor timer 21. If either the lapse of monitor time is within the normal monitor value B or the no response monitor value (B−Z) as defined by cooperation of the status table 29 for the m-th local station 13(m) and the transmission and monitor timing table 27 or the monitor time out signal is not yet delivered from the monitor timer 21, the central receiver unit 19 repeats the first and the third reception steps R1 and R3. Either when the lapse of monitor time reaches the normal monitor value or the no response monitor value or when the monitor time out signal is supplied, the third reception step R3 proceeds to a fourth reception step R4 at which the central receiver unit 19 informs the monitoring unit 23 of reception of no response signal from the m-th local station 13(m). Operation of the central receiver unit 19 comes to the end insofar as the m-th local station 13(m) is concerned.

Figure 6:
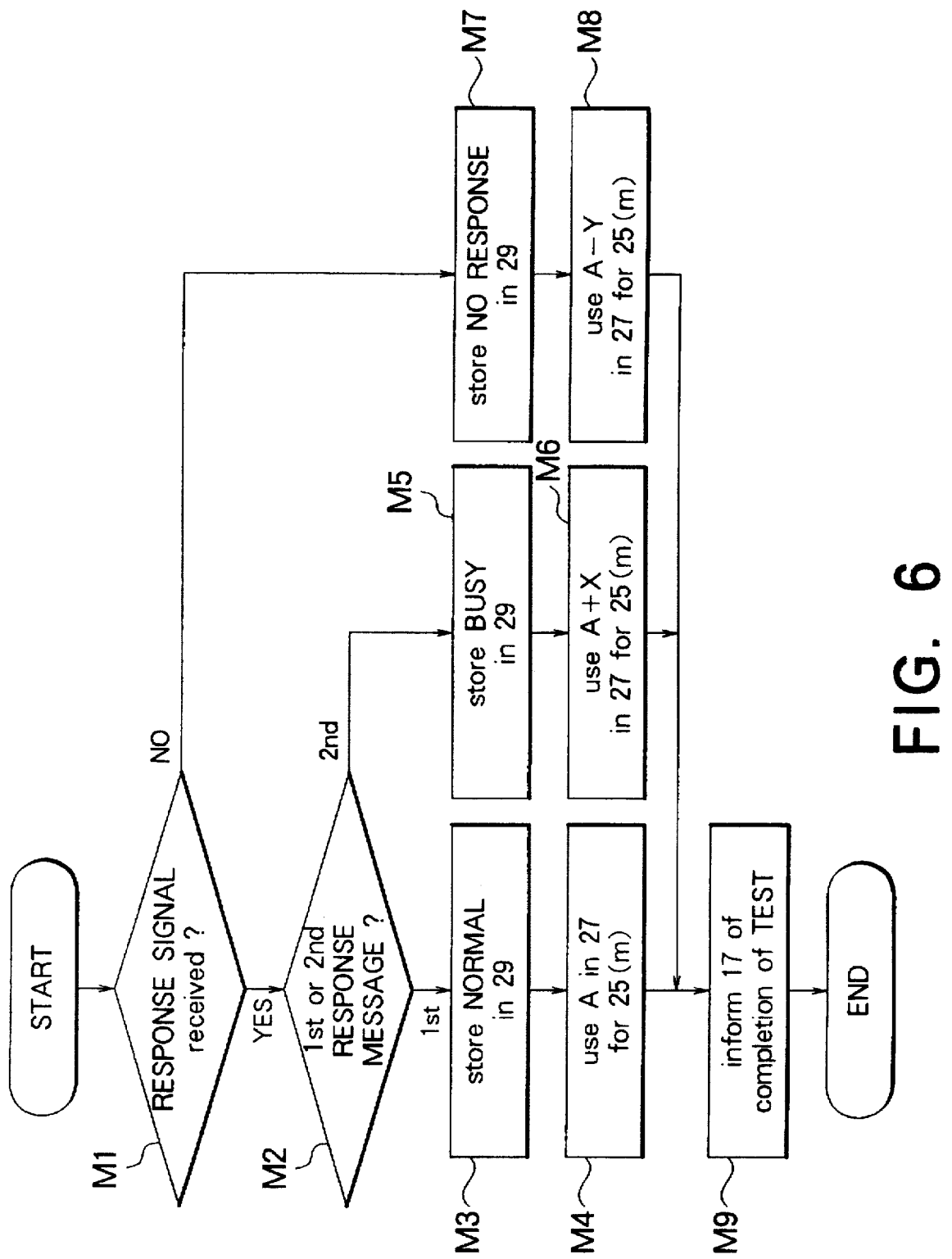
FIG. 6 shows a flow chart for use in exemplifying local station monitoring carried out in the above-described control station.

Still further turning to FIG. 6 with FIGS. 1 through 5 again referred to, the monitoring unit 23 is operable as follows. The monitoring unit 23 starts its operation as regards the m-th local station 13(m) when informed by the central receiver unit 19 of reception of either the response signal at the second reception step R2 or no response signal at the fourth reception step R4.

At a first monitor step M1, the monitoring unit 23 judges whether informed by the central receiver unit 19 of reception of the response signal or of no response signal. When informed of reception of the response signal, the monitoring unit 23 discriminates at a second monitor step M2 the response signal between the first and the second response messages.

When the response signal is discriminated as the first response message at the second monitor step M2, the monitoring unit 23 stores at a third monitor step M3 the state of "normal" in the status table 29 as the latest status of the m-th local station 13(m). Subsequently, the monitoring unit 23 makes at a fourth monitor step M4 the m-th transmission timer 25(m) use the normal test value A upon subsequent transmission of the communication test command by the central transmitter unit 17 to the m-th local station 13(m).

Upon discrimination at the second monitor step M2 of the response signal as the second response message, the monitoring unit 23 stores at a fifth monitor step M5 the state of "busy" in the status table 29 as the latest status of the m-th local station 13(m). Thereafter, the monitoring unit 23 makes at a sixth monitor step M6 the m-th transmission timer 25(m) use the busy test value (A+X) upon subsequent transmission of the communication test command to the m-th local station 13(m).

When informed at the first monitor step M1 of reception of no response signal, the monitoring unit 23 stores at a seventh monitor step M7 the state of "no response" in the status table 29 as the latest status of the m-th local station 13(m). Immediately following this storage, the monitoring unit 23 makes at an eighth monitor step M8 the m-th transmission timer 25(m) use the no response test value (A−Y) in subsequent transmission of the communication test command to the m-th local station 13(m). Moreover in this event, the monitoring unit 23 makes in the transmission and monitor timing table 27 the monitor timer use the no response monitor value (B−Z) in subsequently detecting whether or not the response signal from the m-th local station 13(m) is present.

Subsequent to each of the fourth, the sixth, and the eighth monitor steps M4, M6, and M8, the monitoring unit 23 informs at a ninth monitor step M9 the central transmitter unit 17 of the completion of test. Operation of the monitoring unit 23 comes to an end insofar as concerned with the m-th local station 13(m).

Turning back to FIG. 3 with additional reference to FIGS. 1, 2, and 4 through 6 continued, count up of a lapse of test time starts, when the local station number m is either set to 1 as a current number at the first transmission step T1 or incremented to the current number at the fifth transmission step T5, in one of the transmission timers 25 that is specified by an ordinal number equal to the current number, such as m, and will be called a particular timer. When the lapse of test time reaches either the normal test value or the no response test value defined in the transmission and monitor timing table 27 for the status currently kept in the status table 29 in connection with one of the local stations 13 that is identified by the current number as a particular local station, the particular timer delivers a test time out signal to the central transmitter unit 17 and is reset. In this manner, the initial test cycle comes to the end for the local stations 13. In the meanwhile, operation of the particular station comes to the end as regards the communication test command for the local stations 13. Also, operation of the central receiver unit 19 and of the monitoring unit 23 comes to the end of the initial test cycle for the local stations 13.

Figure 7:
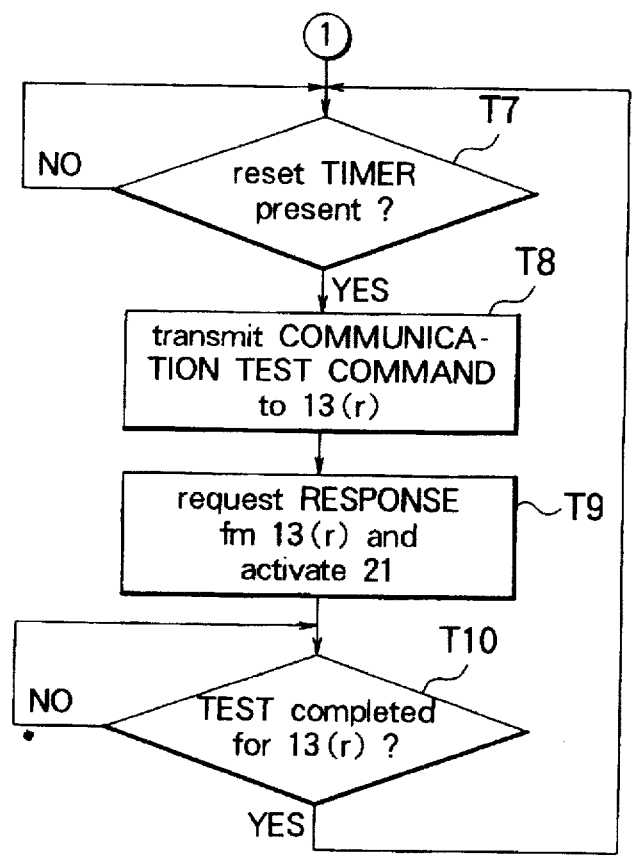
FIG. 7 shows a flow chart for use in exemplifying a remaining part of transmission of the communication test command.

Yet further turning to FIG. 7 with continued reference to FIGS. 1 through 6, transmission of the communication test command proceed to the remaining portion. In the remaining portion, an ordinary test cycle follows the initial test cycle and is repeated as follows. Steps will be numbered in FIG. 7, following the transmission steps T1 to T6 described in conjunction with FIG. 3.

It should be noted that the normal test value A indicates a time interval which is longer than the initial test cycle. As a result, none of the transmission times 25 is reset upon completion of the initial test cycle. The transmission timers 25 are, however, successively reset during repeated progress of the ordinary test cycle. The busy test value (A+X) is greater than the normal test value. The particular timer is consequently less frequently reset during progress of repeated ordinary test cycles while the particular station is busy. The no response time value (A−Y) is smaller than the normal test cycle. The particular timer is therefore frequently reset during the progress and may or may not be reset upon completion of the initial test cycle while the particular station delivers no response signal back to the control station 11.

At a seventh transmission step T7, the central transmitter unit 17 checks whether or not there is one of the transmission timers 25 that is reset to become a reset timer 25(r) having delivered the test time out signal to the central transmitter unit 17. The transmission timers 25 are subjected to this check in a predetermined order, such as in correspondence to the local station number m which is consecutively incremented. If there is none of the transmission timers 25 that is reset, the seventh transmission step T7 is repeatedly executed.

When the reset timer 25(r) is found at the seventh transmission step T7, the central transmission unit 17 sends at an eighth transmission step T8 the communication test command to one of the local stations 13 that corresponds to the reset timer 25(r) and will be referred to as a reset (timer) corresponding station 13(r). Substantially concurrently at a ninth transmission step T9, the central transmitter unit 17 requests the central receiver unit 19 to receive the response signal from the reset corresponding station 13(r) and activates the monitor timer 21. By previous operation of the monitoring unit 23 at a previous time instant, the status of the reset corresponding station 13(r) is already stored in the status table 29. The monitor timer 21 is not put into operation with the use of either the normal monitor value B or the no response monitor value (B−Z).

Put afresh into operation at the ninth transmission step T9, the monitoring unit 23 checks the current status of the reset corresponding station 13(r). At a tenth transmission step T10, the central transmitter unit 17 checks progress of this fresh monitoring operation. When completion of the fresh monitoring operation is confirmed, the tenth transmission step T10 returns to the seventh transmission step T7.

In this manner, the central transmitter unit 17 cyclically repeatedly deals with the seventh through the tenth transmission steps T7 to T10. When the transmission test timers 25 are processed at the seventh transmission step T7 except for those operable with the busy test value, the control station 11 completes one complete cycle of the ordinary test cycles, again starting to deal with a next cycle of the ordinary test cycles at the seventh transmission step T7. The local stations 13, the central receiver unit 19, and the monitoring unit 23 are operable as described with reference to FIGS. 4 through 6.

Incidentally, the no response monitor value is rendered small in order to expedite successive tests of the "no response" status of the local stations 13. The greater busy test value is used in order to reduce an undesirable load on a busy local station and to avoid disturbances to the communication data being processed. The smaller test and monitor values are used in order to rapidly detect the recovery from the failure.

Figure 8:
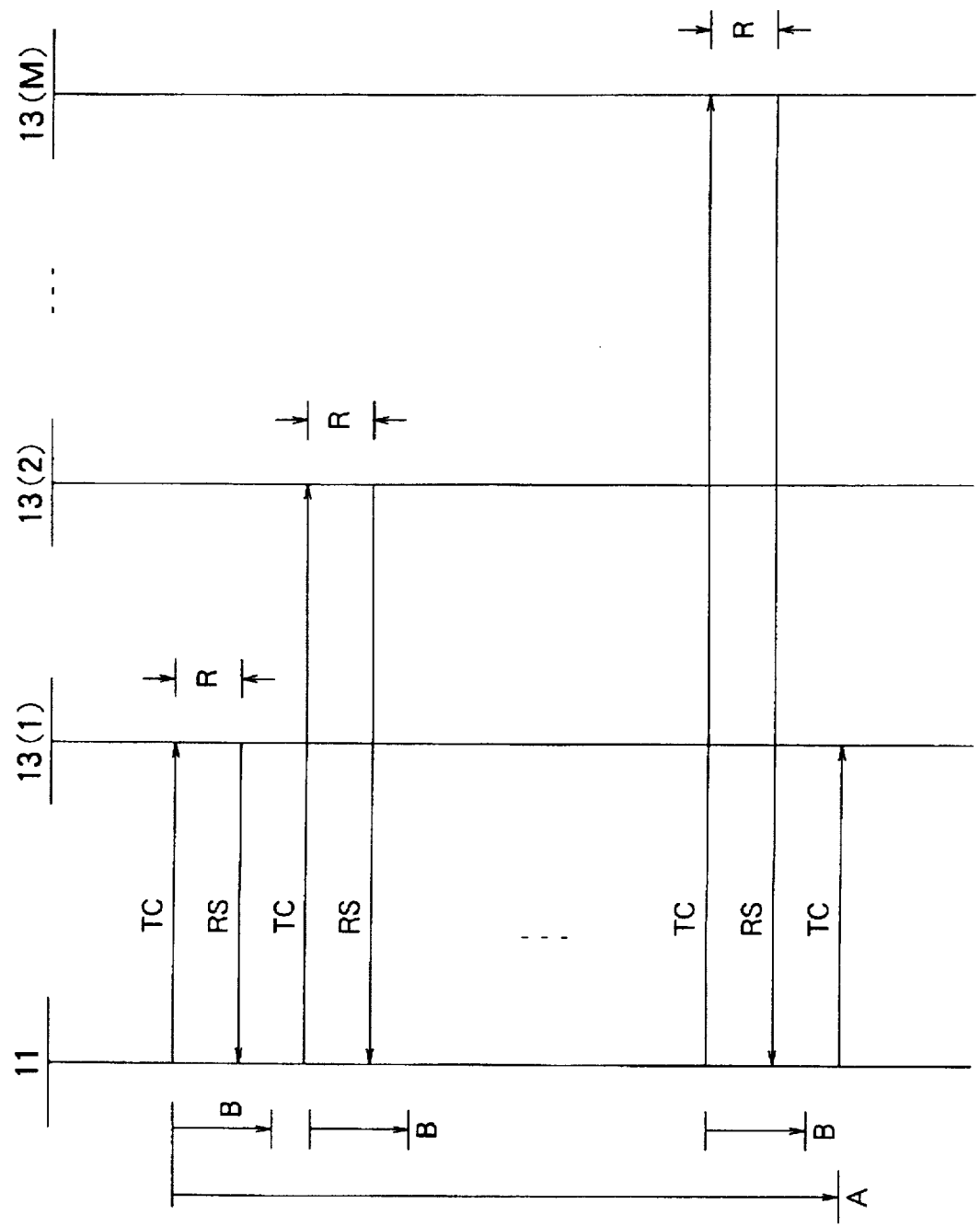
FIG. 8 exemplifies a sequence of a local station monitoring operation performed in the communication network of FIG. 1.

Referring now to FIG. 8 and repeatedly to FIGS. 1 through 7, the control station 11 sends during the initial test cycle the communication test command successively to the first, the second, ..., and the M-th local stations 13(1), 13(2), ..., and 13(M) in the manner indicated by arrows, each with a legend TC. Meanwhile, the first, the second, .. ., and the M-th local stations send the response signals back to the control station 11 as depicted by arrows, each with another legend RS. At each local station 13(m), production of the response signal lags behind reception of the communication test command by the response interval which is equal to a distance between a pair of horizontal parallel lines TC and RS and indicated at R.

The normal test value A later than delivery of the communication test command from the control station 11 to the first local station 13(1), the control station 11 transmits during the ordinary test cycle the communication test command again to the first local station 13(1). Incidentally, the normal monitor time B is depicted near a vertical line drawn downward from the control station 11.

Figure 9:
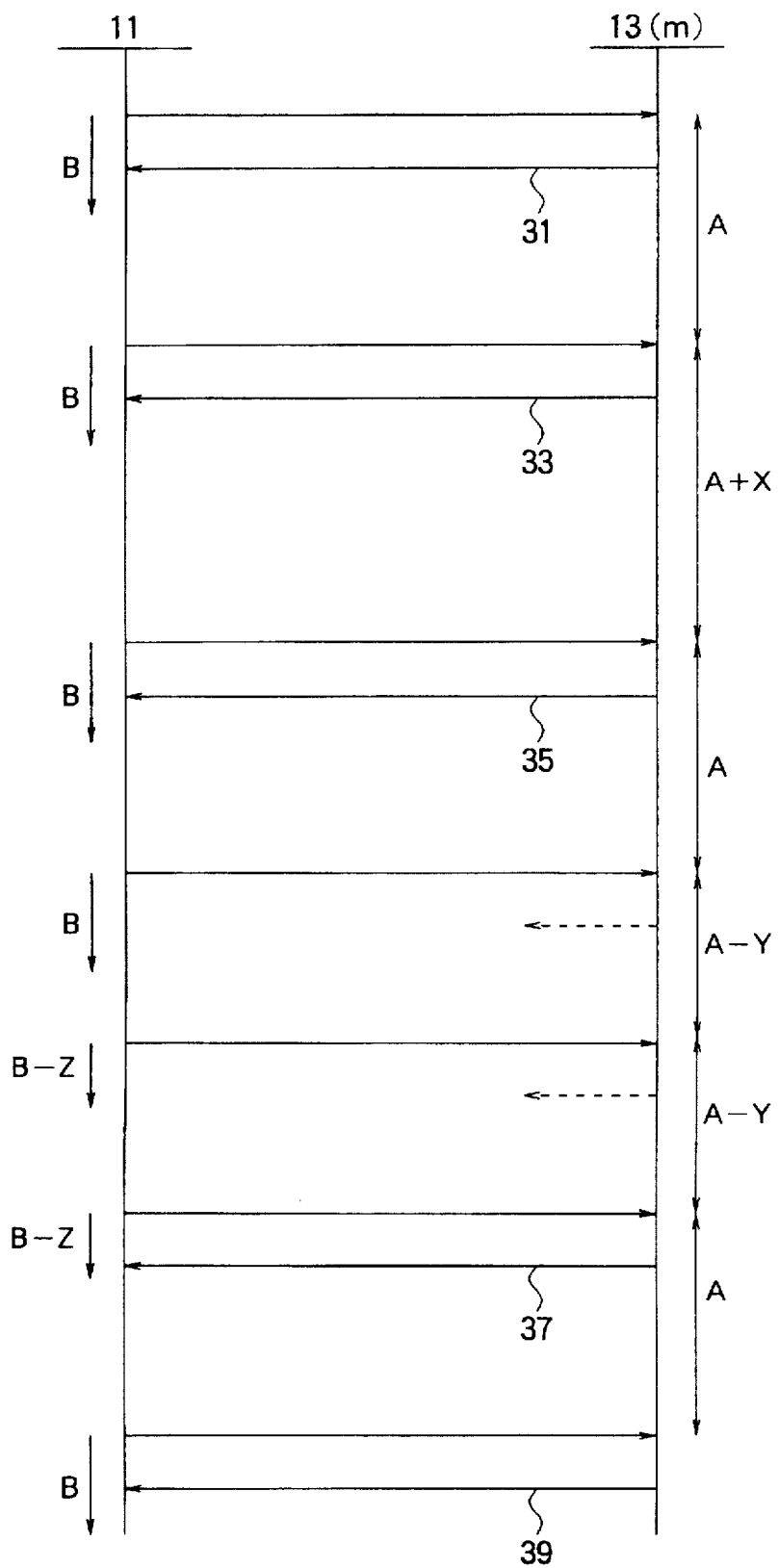
FIG. 9 exemplifies another sequence of the local station monitoring operation illustrated in FIG. 8.

Referring afresh to FIG. 9 and again to FIGS. 1 through 8, operation of the local station monitoring system will be described in connection with the control station 11 and the m-th local station 13(m) which is put in various statuses of operation as the time passes on. Along a vertical line representative of the m-th local station 13(m), indicated here and there are the normal test value A, the busy test value (A+X), and the no response test value (A−Y). Along another vertical line for the control station 11, indicated are the normal monitor value B and the no response monitor value (B−Z).

It is presumed during the initial test cycle that the m-th local station 13(m) is in the normal operation and is not busy. Responsive to the communication test command directed to the m-th local station 13(m), the first response message is sent back to the control station 11 in the manner indicated by a reference numeral 31. In the control station 11, the monitoring unit 23 detects the first response message and gives the normal test value and the normal monitor value to the lapses of test and monitor time which the m-th transmission timer 25(m) and the monitor timer 21 should measure for the subsequent transmission of the communication test command and the subsequent detection of the reception signal which may or may not be sent back from the m-th local station 13(m) in response to this communication test command.

Immediately after the ordinary test cycle for the local stations 13, a first ordinary test cycle begins. Reset of the m-th transmission timer 25(m) is detected in due course to again transmit the communication test command to the m-th local station 13(m). It is presumed that the m-th local station 13(m) is put in the meantime into the busy state. Consequently, the m-th local station 13(m) sends the second response message as indicated by another reference numeral 33. In response, the monitoring unit 23 makes the m-th transmission timer 25(m) and the monitor timer 21 use the busy test value and the normal monitor value.

Immediately following completion of the first ordinary test cycle, a second ordinary test cycle starts. The m-th local station 13(m) is put back meanwhile into the normal operation. Upon reception of the communication test command, the m-th local station transmits the first response message back to the control station 11 as indicated at 35. Operation of the monitoring unit 23 is similar to that described above in conjunction with the initial test cycle.

A third ordinary test cycle immediately follows an end of the second ordinary test cycle. It is now presumed that the m-th local station 13(m) is put in the meanwhile out of the normal operation. In response to the communication test command destined at the m-th local station 13(m), no response signal is sent to the control station 11 in the manner depicted by a dashed line with an arrowhead. In the control station 11, this fact is detected upon lapse of the monitor time of the normal monitor value to reset the m-th transmission timer 25(m). The monitoring unit 23 makes the m-th transmission timer 25(m) and the monitor timer 21 use the no response test value and the no response timer value.

In a fourth ordinary test cycle immediately following completion of the third ordinary test cycle, it is presumed that the m-th local station 13(m) is still out of the normal operation. In any event, reset of the m-th transmission timer 25(m) is detected in an earlier step of the fourth ordinary test cycle. The no response test and monitor values are again used in the m-th transmission timer 25(m) and in the monitor timer 21. Inasmuch as the no response test value is small, the control station 11 may direct the communication test command to the m-th local station 13(m) again in the fourth ordinary test cycle although this multiple transmission of the communication test command to the local station in trouble is not depicted.

It is now presumed that the m-th local station 13(m) is put back to the normal operation in due course before beginning of a fifth ordinary test cycle following the fourth ordinary cycle. When time out of the m-th transmission timer 25(m) is detected in the fifth ordinary test cycle, the communication test command is transmitted to the m-th local station 13(m). In response, the first response message is sent back to the control station 11 as indicated at 37 if the m-th local station 13(m) is not yet used in transmitting the communication data. In response, the normal test value and the normal monitor value are used as depicted bottomwise along the vertical lines for the m-th local station 13(m) and the control station 11 for transmission of the communication test command to the m-th local station 13(m) and for detection of the first response message from the m-th local station 13(m) as indicated at 39.

It is clear from the foregoing that the busy status of each local station 13(m) is little adversely affected by the local station monitoring according to this invention. It is similarly clear that the recovery from a defect in each local station 13(m) and/or the transmission path 15 is quickly detected.

Figure 10:
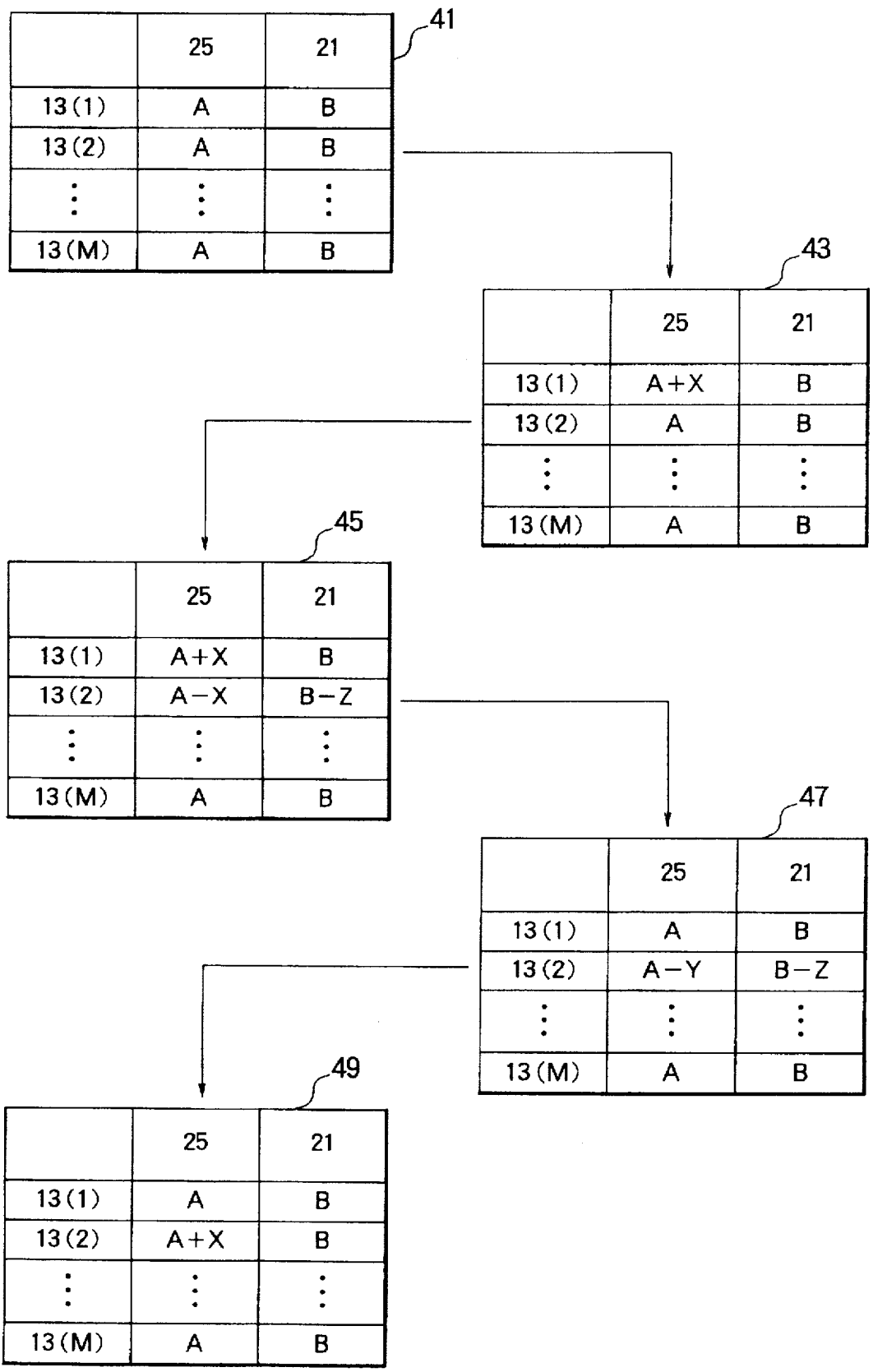
FIG. 10 exemplifies a variation in time of operation in the control station mentioned in conjunction with FIG. 2.

Turning to FIG. 10 with FIGS. 1 through 8 again referred to, values for the transmission timers 25 and the monitor timer 21 are varied in accordance with the statuses of the local stations 13. These values are exemplified in tables under headings 25 and 21 for the first through the M-th local stations 13(1), 13(2), . . . , and 13(M).

In the manner listed in a first table 41, the normal test value is used in all of the transmission timers 25 at start of the initial test cycle. The normal monitor value is successively used throughout the initial test cycle for the monitor timer 21. It is surmised during progress of the initial test cycle that the first local station 13(1) becomes busy. In this event, the busy test value is substituted for the normal test value for the first transmission timer 25(1) as indicated in a second table 43.

During the first ordinary test cycle, it is surmised that the first local station 13(1) is still busy and that the second local station 13(2) is found to be out of the normal operation. As listed in a third table 45, the busy test value is continuously used for the first transmission timer 25(1) with the normal monitor value used for the monitor timer 21 in detecting presence or absence of the response signal sent back from the first local station 13(1). The no response test value is used for the second transmission timer 25(2) with the no response monitor value used for the monitor timer 21 in detecting whether or not the response signal is sent back from the second local signal later, for example, in the second ordinary test cycle.

In the second ordinary test cycle, it is surmised that the first local station 13(1) gets out of the busy status into the normal operation and that the second local station 13(2) is still out of the normal operation. As listed in a third table 47, the normal test value is used for the first transmission timer 25(1) with the normal monitor value used for the monitor timer 21 for the response signal returning from the first local station 13(1). The no response test and monitor values are kept as in the third table 47 for the second transmission timer 25(2) and for the monitor timer 21 for the second local station 13(2).

During the third ordinary test cycle, it is surmised that the first local station 13(1) is kept in the normal operation and that the second local station 13(2) has got rid of the defect and is put into the busy status. As shown in a fourth table 49, the normal test and monitor values are used for the first transmission timer 25(1) and for the monitor timer 21 for use in detecting presence or absence of the response signal returning from the first local station 13(1) during the fourth ordinary test cycle. The busy test value is used for the second transmission timer 25(2) with the normal monitor value used for the monitor timer 21 in detecting the response signal returned from the second local station 13(2) in the fourth ordinary test cycle.

While this invention has thus far been described in specific conjunction with a sole preferred embodiment thereof, it will now readily be possible for one skilled in the art to put this invention into practice in various other manners. For example, it is possible to make the first and the second response messages include an identifier of each local station, such as 13(m). Either when such identifiers are included in the communication test commands directed individually to the local stations 13 or when the communication test commands are carried on carriers of respective frequencies or wavelengths, it is possible to make the central transmitter unit 17 transmit in each test "cycle" the communication test commands concurrently to the local station 13 in the normal operation and activate the central receiver unit 19 and the monitor timer 21 for detection of the response signal. It is preferred even under the circumstances to defer a subsequent test of the busy local station according to the busy test value and to expedite repeated tests of the local station out of the normal operation by using the no busy test value with the normal monitor value used first in the repeated tests and with the no response monitor value used later in the repeated tests.

What is claimed is:

1. A local station monitoring method of monitoring, in a communication network comprising a control station, a local station, and a transmission path for communication between said control station and said local station, said local station by said control station with transmission of a communication test command to said local station at a test interval and with reception of a response signal from said local station as regards whether or not said local station is in normal operation, comprising the steps of:

transmitting at said local station back to said control station a first and a second response message as said response signal upon reception of said communication test command when said local station is not busy and is busy, respectively; and using at said control station a longer interval than said test interval on subsequently transmitting said communication test command to said local station while said control station receives said second response message.

2. A local station monitoring method as claimed in claim 1, wherein said control station repeats transmission of said communication test command to said local station at said test interval while said control station receives said first response message.

3. A local station monitoring method as claimed in claim 1, further comprising the step of using at said control station a shorter interval than said test interval on subsequently transmitting said communication test command to said local station while said control station does not receive said response signal.

4. A local station monitoring method as claimed in claim 3, further comprising the step of using at said control station a monitor interval shorter than said shorter interval in subsequently detecting reception of said response signal while said control station receives said response signal.

5. A local station monitoring method as claimed in claim 4, wherein said monitor interval using step uses a shorter interval than said monitor interval, while said control station does not receive said response signal, in subsequently detecting whether or not said control station receives said response signal.

6. A local station monitoring system for monitoring, in a communication network comprising a control station, a local station, and a transmission path for communication between said control station and said local station, said local station by said control station with transmission of a communication test command to said local station at a test interval and with reception of a response signal from said local station as regards whether or not said local station is in normal operation, wherein:

said local station comprises local transmitting means responsive to said communication test command for transmitting a first and a second response message as said response signal back to said control station when said local station is not busy and is busy, respectively, upon reception of said communication test command;

said control station comprising transmission timing means for timing subsequent transmission of said communication test command to said local station with a longer interval than said test interval used while said control station receives said second response message.

7. A local station monitoring system as claimed in claim 6, wherein said transmission timing means times subsequent transmission of said communication test command to said local station with a shorter interval than said test interval used while said control station does not receive said response signal.

8. A local station monitoring system as claimed in claim 7, wherein said control station further comprises monitor timing means for measuring a monitor interval shorter than said shorter interval from transmission of said communication test command to said local station to monitor whether or not said control station subsequently receives said response signal.

9. A local station monitoring system as claimed in claim 8, wherein said monitor timing means measures a shorter interval than said monitor interval, while said control station does not receive said response signal, to monitor whether or not said control station subsequently receives said response signal.

10. A local station monitoring system as claimed in claim 9, said local station being each of a plurality of local stations, said transmission path being for communication between said control station and each of said local stations, said local stations being supplied with said communication test command at least once during each of successive test cycles to individually send said response signal back to said control station while kept in said normal operation, wherein said monitor timing means measures the shorter interval than said monitor interval to monitor, during one test interval later than said each of successive test cycles, presence or absence of the response signal sent from one of said local stations that did not send the response signal back to said control station in said each of said test cycles.

11. A local station monitoring system as claimed in claim 7, said local station being each of first through M-th local stations, where M represents a predetermined integer, said transmission path being for communication between said control station and each of said first through said M-th local stations, said first through said M-th local stations being supplied with said communication test command once during each of successive test cycles to individually send said first and said second response messages back to said control station while being not and being busy in said normal operation, respectively, wherein said transmission timing means comprises a controllable transmitter for transmitting said communication test command to each of said first through said M-th local stations and first to M-th transmission timers in one-to-one correspondence to said first through said M-th local stations for timing said transmitter as regards transmission of said communication test command, an m-th transmission timer using said longer interval for transmission of said communication test command to an m-th local station during one of said test cycles when said m-th local station was busy in another of said test cycles that immediately precedes said one of test cycles, where m represents one of 1 through M, both inclusive.

12. A local station monitoring system as claimed in claim 6, wherein said transmission timing means times subsequent transmission of said communication test command to said local station with said test interval used while said control station receives said first response message.

13. A control station for monitoring, in a communication network comprising besides said control station a local station and a transmission path for communication between said control station and said local station, said local station as regards whether or not said local station is in normal operation, wherein said control station comprises:

transmitting means for transmitting a communication test command to said local station at a test interval;

receiving means for receiving a response signal transmitted from said local station back to said control station in response to said communication test command with a first and a second response message received as said response signal when said local station is not busy and is busy upon reception of said communication test command, respectively; and transmission timing means for timing said transmitting means for subsequent transmission of said communication test command to said local station with a longer interval than said test interval used while said receiving means receives said second response message.

14. A control station as claimed in claim 13, wherein said transmission timing means times said transmitting means for subsequent transmission of said communication test command to said local station with a shorter interval than said test interval used while said receiving means does not receive said response signal.

15. A control station as claimed in claim 14, further comprising:

monitor timing means for measuring a monitor interval shorter than said shorter interval from transmission of said communication test command to said local station; and judging means for judging said local station as not in normal operation when said receiving means does not receive said response signal within said monitor interval from subsequent transmission of said communication test command to said local station.

16. A control station as claimed in claim 15, wherein:

said monitor timing means measures a shorter interval than said monitor interval while said receiving means does not receive said response signal;

said judging means judging said local station as not in normal operation while said receiving means does not receive said response signal within the shorter interval than said monitor interval.

17. A control station as claimed in claim 16, said local station being each of a plurality of local stations, said transmission path being for communication between said control station and each of said local stations, said local stations being supplied with said communication test command at least once during each of successive test cycles to individually send said response signal back to said control station while kept in said normal operation, wherein said monitor timing means measures the shorter interval than said monitor interval to monitor, during one of said test cycles, presence or absence of said response signal sent from one of said local stations that did not send the response signal back to said control signal in an immediately preceding one of said test cycles.

18. A control station as claimed in claim 14, said local station being each of first through M-th local stations, where M represents a predetermined integer, said transmission path being for communication between said control station and each of said first through said M-th local stations, said first through said M-th local stations being supplied with said communication test command once during each of successive test cycles to individually send said first and said second response messages back to said control station while being not and being busy in said normal operation, respectively, wherein said transmission timing means comprises a controllable transmitter for transmitting said communication test command to each of said first through said M-th local stations and first through M-th transmission timers in one-to-one correspondence to said first through said M-th local stations for timing said transmitter as regards transmission of said communication test command, an m-th transmitter timer using said longer interval for transmission of said communication test command to an m-th local station during one of said test cycles when said m-th local station was busy in another of said test cycles that immediately precedes said one of test cycles, where m represents one of 1 through M, both inclusive.

19. A control station as claimed in claim 13, wherein said transmission timing means times said transmitting means for subsequent transmission of said communication test command to said local station with said test interval used while said receiving means receives said first response message.

20. A local station monitored, in a communication network comprising besides said local station a control station and a transmission path for communication between said control station and said local station, by said control station with a communication test command transmitted from said control station to said local station at a test interval, wherein:

said local station comprises:

local receiving means for receiving said communication test command; and local transmitting means for transmitting a response signal back to said control station with a first and a second response message used as said response signal if said local station is not busy and is busy, respectively, when said local receiving means receives said communication test command; said control station comprising transmission timing means for timing subsequent transmission of said communication test command to said local station with a longer interval than said test interval used while said control station receives said second response message;

said control station judging, when said control station receives and does not receive said response signal within a monitor interval shorter than said test interval after previous transmission of said communication test command, that said local station is in normal and is not in normal operation, respectively.

\* \* \* \* \*